(12) United States Patent
Nelson

(10) Patent No.: US 8,167,281 B2
(45) Date of Patent: May 1, 2012

(54) LIQUID DISTRIBUTION IN A DISTILLATION APPARATUS

(75) Inventor: Alphonzo George Nelson, Novato, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 731 days.

(21) Appl. No.: 12/275,495

(22) Filed: Nov. 21, 2008

(65) Prior Publication Data

US 2009/0200689 A1    Aug. 13, 2009

Related U.S. Application Data

(60) Provisional application No. 61/015,971, filed on Dec. 21, 2007.

(51) Int. Cl.
*B01F 3/04* (2006.01)
(52) U.S. Cl. .................................... 261/114.1; 202/158
(58) Field of Classification Search .... 261/114.1–114.5; 202/158
See application file for complete search history.

(56) References Cited

U.S. PATENT DOCUMENTS

| | | | |
|---|---|---|---|
| 3,125,614 A * | 3/1964 | Mayfield et al. | 261/114.3 |
| 3,399,870 A * | 9/1968 | Zuiderweg et al. | 261/114.1 |
| 4,036,918 A * | 7/1977 | Morgan et al. | 261/114.1 |
| 4,159,291 A * | 6/1979 | Bruckert et al. | 261/114.1 |
| 4,234,544 A * | 11/1980 | Christman | 422/256 |
| 4,499,035 A * | 2/1985 | Kirkpatrick et al. | 261/114.3 |
| 4,504,426 A * | 3/1985 | Chuang et al. | 261/114.1 |
| 4,698,138 A | 10/1987 | Silvey | |
| 4,714,542 A | 12/1987 | Lockett, Jr. | |
| 4,995,946 A | 2/1991 | Auger | |
| 5,232,283 A * | 8/1993 | Goebel et al. | 366/336 |
| 5,972,171 A | 10/1999 | Ross et al. | |
| 7,270,316 B2 * | 9/2007 | Burch | 261/114.1 |
| 2004/0099969 A1 * | 5/2004 | Larson et al. | 261/114.5 |

FOREIGN PATENT DOCUMENTS

SU    1286229 A1 *  1/1987 ................. 261/114.1

* cited by examiner

*Primary Examiner* — Richard L Chiesa
(74) *Attorney, Agent, or Firm* — Alan W. Klaassen

(57) ABSTRACT

A tray deck with a distillation column includes a sump suspended from the tray deck for receiving a liquid mixture from the tray deck, at least one vapor opening for rising vapor through the tray deck and at least one vapor baffle for receiving vapor passing through the vapor opening.

16 Claims, 3 Drawing Sheets

LIQUID DISTRIBUTION IN A DISTILLATION APPARATUS

This application claims the benefit of provisional Application No. 61/015,971, filed Dec. 21, 2007, and herein incorporated in its entirety.

BACKGROUND OF THE INVENTION

This invention relates to apparatus and methods for improved operation of a distillation column. The invention also relates to an improved method for addressing the problem of entrainment of liquid droplets by a rising vapor stream within the flash zone of a distillation column.

Separation units such as distillation units and product strippers are major processing units in a refinery. Fractional distillation is used commercially to separate or purify fluids, and is usually carried out in a distillation column filled with either packing or trays. A trayed column consists of a stack of trays inside a shell. The trays are provided with holes to permit vapor to rise and vertical channels (downcomers) to permit the liquid to descend. Liquid and vapor are mixed on each tray, thus affecting a stage of distillation. For some columns, more than one downcomer per tray is used to reduce the liquid gradient and to provide liquid handling capacity on the tray. Trays of this type are often referred to as "multi-pass" trays. Trays of this type are described, for example, in U.S. Pat. No. 4,995,946, the entire disclosure of which is incorporated herein by reference for all purposes. Each tray is typically designed to ensure that the liquid and vapor are mixed completely and in the right proportion and that none of the liquid or vapor is permitted to leave a tray without this mixing. This is particularly important for multi-pass trays. Fractional distillation may be accomplished at sub-atmospheric pressure, at atmospheric pressure and at super-atmospheric pressure.

U.S. Pat. No. 4,698,138 teaches a chimney comprising a riser and hat which has an annulus between them. This patent teaches that the cross-sectional area of the annulus is less than that of the cross-sectional area of the riser, so that the momentum imparted to the entrained droplets drives them downwardly while the lighter vapor undergoes the second direction change and continues upward.

U.S. Pat. No. 4,714,542 teaches a process involving the introduction of a vaporizing liquid feed into a mixing and separation chamber of a flash zone via a tangential nozzle, which directs the feed into a circumferential path to enhance mixing, and the redirection of rising vapors from the distillation below the flash zone by baffling these vapors into the chamber inlet.

U.S. Pat. No. 5,972,171 teaches a de-entrainment tray that has a tray deck and a plurality of risers extending vertically up from the tray deck. The risers are provided with devices for imparting rotational movement to the fluid stream, entering the riser. The rotational movement imparted to the fluid stream causes the liquid to separate from the vapor stream and to flow upward along the riser walls. The de-entrained liquid is then transported from above the separation tray back into the flash zone by way of a liquid downcomer. The vapor stream separates from the liquid within the riser and flows out of the riser upward through the column. A riser hat is used to prevent a wash liquid from entering the riser and preferably also from entering the liquid downcomer.

The feed stream to a vacuum distillation unit is generally under turbulent conditions and thus the feed is easily entrained in the vapors that are being flashed off from the incoming feed stream. Entrainment is undesirable because heavier liquid hydrocarbons are carried upward into the distillation column and recovered in lower boiling product fractions, reducing the separation efficiency and broadening the boiling range of the individual recovered fractions. When heavier fractions in a distillation column feed contain metals, entrainment causes lighter, clean distillate fractions to be contaminated with metals. Metal-containing streams can cause severe fouling problems to pipes, pumps, valves and catalytic processes downstream of the distillation column. The reduced fractionation efficiency resulting from entrainment increases as the liquid load in the distillation column increases. Increased liquid load is particularly troublesome in the stripping section of the distillation column below the feed section. In order to meet these challenges, multipass trays may be installed in the stripping section to increase efficiency. But, operating these multi-pass trays at high efficiency requires that liquid passed to these trays from the flash zone be done in a manner to take advantage of the operation of these trays. Additional innovation is required to address the matter of passing liquids from the flash zone to the stripping section.

SUMMARY OF THE INVENTION

The present invention relates to a tray deck and to a method for improved liquid distribution in a distillation column. In one embodiment, the tray deck comprises: a horizontal section for conducting a liquid mixture in circular flow across the section; at least one liquid opening in the horizontal section for passing liquid through the tray deck; a sump suspended from the tray deck for receiving liquid which passes through the liquid opening; at least one vapor opening for passing vapors through the tray; and at least one vapor baffle for receiving vapor passed through the vapor opening.

In another embodiment, the invention relates to a distillation column which comprises: a feed nozzle for introducing a vaporizing feed mixture into the distillation column; and a tray deck, wherein the tray deck comprises a horizontal section for conducting a liquid mixture in circular flow across the section; at least one liquid opening in the horizontal section for passing liquid through the tray deck; a sump suspended from the tray for receiving liquid which passes through the liquid opening; at least one vapor opening for passing vapors through the tray deck; and at least one vapor baffle for receiving vapor passed through the vapor opening.

In another embodiment, the invention relates to a flash zone within a distillation column, the flash zone comprising a feed nozzle for introducing a vaporizing feed mixture into the flash zone; and a tray deck, wherein the tray deck comprises a horizontal section for conducting a liquid mixture in circular flow on the tray deck; at least one liquid opening in the horizontal section for passing liquid through the tray deck; a sump suspended from the tray deck for receiving liquid which passes through the liquid opening; at least one vapor opening for passing vapors through the tray deck; and at least one vapor baffle for receiving vapor passed through the vapor opening.

DETAILED DESCRIPTION OF THE INVENTION

Figure 1:
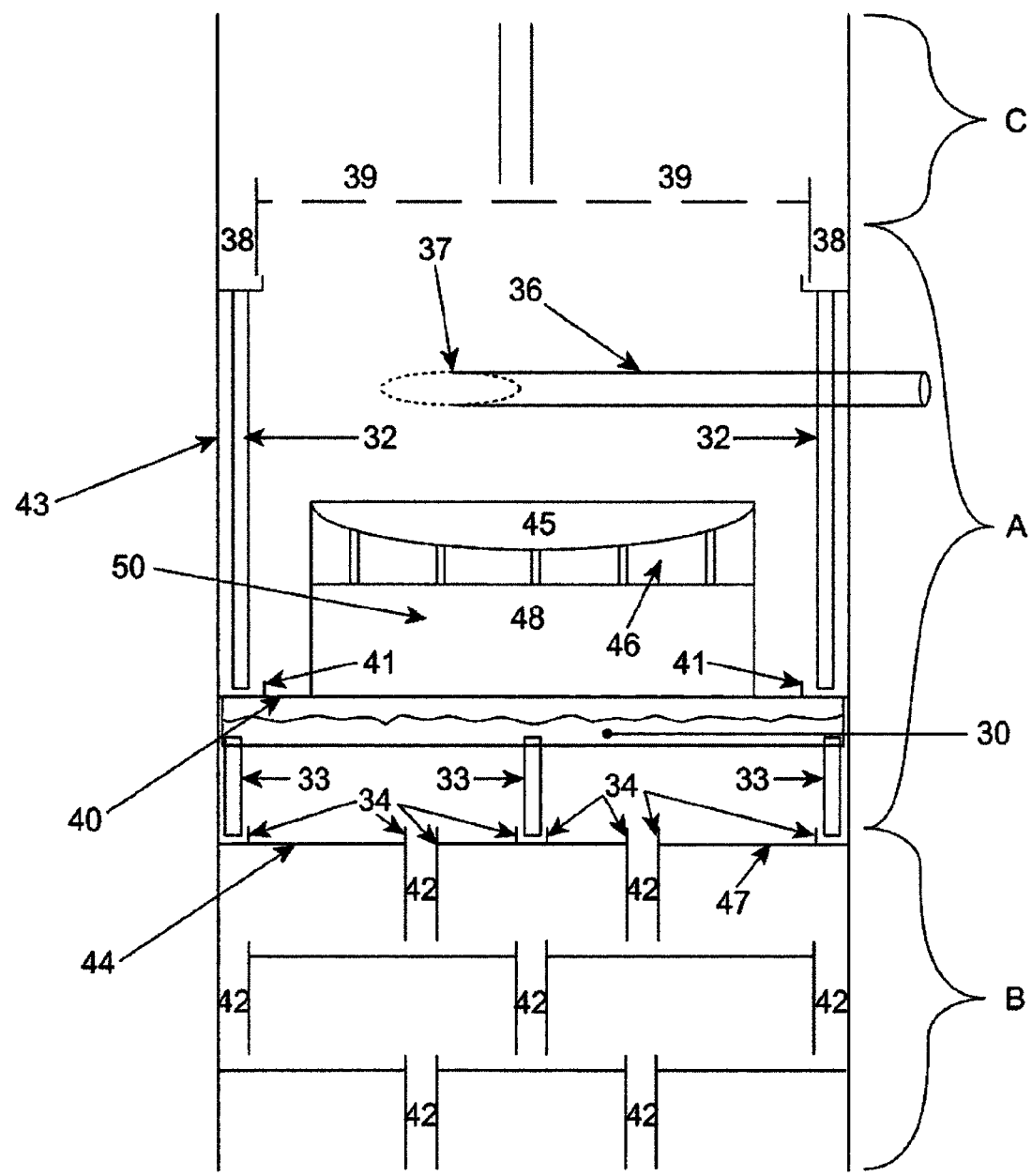
FIG. 1 illustrates a horizontal view of a distillation column of this invention.

Certain terms are defined throughout this description as they are first used, while certain other terms used in this description are defined below.

A flash zone is a region within the distillation column in which the feed mixture is supplied into the column.

The stripping zone is the region of the distillation column beneath the flash zone for receiving liquids flowing downward from the flash zone and for supplying vapors upward into the flash zone.

The wash oil zone is the region of the distillation column above the flash zone for receiving vapors flowing upward from the flash zone and for supplying liquids flowing downward into the flash zone.

The feed mixture is the mixture supplied to the distillation column for separation. In some embodiments, the feed mixture is supplied to the distillation column at a temperature and at a pressure such that some of the components of the feed mixture are in the vapor phase. In a further embodiment, at least a portion of the feed mixture supplied to the column is converted to a vapor at the pressure and temperature in the region of the flash zone where the feed mixture is supplied to the column.

In an embodiment, the flash zone contains or includes a feed nozzle for introducing a vaporizing feed mixture. The feed nozzle is oriented to provide for tangential entry of the liquid feed into the flash zone to establish a cyclonic fluid flow, with a high velocity gas spiral at the outside and an upward-moving core of gas at the inside of the spiral flow. At the same time, the liquid component of the material exiting the feed nozzle is forced into spiral flow along the column wall, swirling circumferentially within the flash zone and gradually flowing downward and collecting on a collector tray deck.

In an embodiment, the flash zone contains or includes a collector tray deck, positioned such that at least a portion of the liquid from the feed mixture flows in a roughly circular pattern along the collector tray before passing downward through a liquid opening in the tray. It will be recognized by the skilled practitioner that the fluid which is herein termed a liquid has characteristics may have the characteristics of a two-phase froth, as the contacting of vapor and liquid generally forms a froth or spray on or above the tray deck.

After contacting the liquid, the vapor disengages from the liquid and travels upward through the flash zone. A portion of the froth or spray above the deck of the tray may be entrained by the rising vapor, and carried upward in the column. As the frothy feed mixture leaves the deck it travels through a liquid opening in the tray and into a catch basin termed a sump.

Proper distribution of liquid across the tray is critical for multi-pass trays, having several downcomers for passing liquid to the tray below. Each panel of the tray is separated from other panels on the same tray by the downcomers. To effect acceptable liquid distribution requires that liquid be deposited on each panel independent of liquid deposited on the other panels. To this end a sump is provided in the present invention to provide multiple downcomer pipes for passing liquid which is collected on the tray deck of the flash zone section of a distillation column onto a multi-pass tray which is employed as the top tray of the stripping section of the distillation column.

The sizing, number and orientation of the pipe downcomers which extent from the sump to the top stripping tray are selected to achieve the desired distribution of liquid on the top stripping tray. In some embodiments, the top stripping tray is a multi-pass tray, with more than one panel separated by downcomers. Each panel is perforated with openings through which vapor passes upward to contact liquid flowing across the panel. A liquid level is maintained on the tray by a device termed a weir. The liquid on the tray flows over the weir and downward through the downcomer. The downcomer is designed to disengage any vapor that is in this mixture. The disengaged vapor leaves out the top of the downcomer while the clarified liquid travels downward through the downcomer and is fed to the tray below.

It is generally desired that the liquid flowing across the panels in the top stripper tray be uniform in depth, volume and rate. To this end, the pipe downcomers in the sump are situated so as to pass liquid from the sump to each panel in a uniform and predictable manner.

The stripping zone, below the flash zone, produces an upflowing vapor stream to the flash zone. The top stripping tray generates a spray of liquid which varies in height with the vapor loading on the tray (i.e., the higher the vapor loading on the tray, the higher the column of spray). That portion of the spray which enters the updraft core of the flash zone is carried upward into the wash oil zone. In the invention, the collector tray deck includes at least one de-entrainment baffle, which at least partially reduces the amount of stripping zone spray originating below the flash zone from entering the central updraft. The baffle forces the gas and entrained liquid laterally into the outer region of the flash zone where the rotational component of the gas velocity is greatest and the upward component is smallest. The spray is caught in the swirl of the flash zone vapor and is thrown to the column wall where it coalesces and joins the film of liquid running down.

Thus, at least one de-entrainment baffle (otherwise termed a vapor baffle) at least partially isolates liquid which is supplied through the feed nozzle from the vapor which is flowing upward from the stripping zone beneath the flash zone. In some embodiments, the baffle has vertical sides supported by the collection tray such that the entire vapor flow passing through the vapor opening in the collector tray passes upward through and within the de-entrainment baffle. In some embodiments, the baffle has a cross-section profile corresponding to the shape of the at least one vapor opening in the collector tray. In some other embodiments, the baffle has a cross-section profile which is larger than the at least one vapor opening in the collector tray. In some embodiments, the baffle has a semi-circular cross section.

In some embodiments, the baffle comprises a riser section and a riser hat, wherein the hat is supported on the vertical riser section to provide an opening between the riser section and the hat, thereby permitting the flow of vapors therethrough. In some embodiments, the top may be a flattened metal element, either positioned in a horizontal orientation or tilted somewhat from horizontal. In some other embodiments, the top may be shaped. A shape selected from a curved section, a hemispherical section, a conical section, or combinations of connected flat sections are non-limiting illustrative examples of a top for the baffle. In some embodiments, the top has a cross-sectional profile which is the same as the profile of the vertical sides. In some other embodiments, the top has a cross-sectional profile which is larger than the cross-sectional profile of the vertical sides, so as to further cover the opening within the baffle and reduce the amount of liquid from the flash zone entering the interior of the baffle.

In some embodiments, the total height of the baffle above the top stripping tray is at least 2 feet. In another embodiment, the total height of the baffle above the top stripping tray is no less than one tray spacing. In another embodiment, the maximum height of the baffle is set to establish a minimum clearance of about 6 inches between the top of the baffle and the bottom of the feed inlet conduit. The area of the opening between the riser section and the riser hat is established by the cross-sectional area of the riser section. In one embodiment, the area of the opening is 0.5 to 2 times the cross-sectional area of the cylindrical riser section.

The liquid opening in the collector tray deck provides for flow of liquid from the collector tray into a sump which is suspended beneath the collector tray. The sump comprises generally vertical sides, a bottom section and more than one downcomer pipe penetrating the bottom section and extending downward for delivering liquid from the sump to the stripping zone below. In some embodiments, the sump is a container having a rectangular cross section. The sump will generally have a cross section which is equal in size or larger than the liquid opening in the tray deck. In some embodiments, the downcomer pipes are sized such that a level of liquid is maintained in the sump during normal operation of the distillation column. The use of pipe downcomers to remove liquid from the sump, rather than conventional segmental downcomers, enables the incorporation of flow feedback control loops utilizing pipe mass flow meters and adjustment valves for applications. This feature provides benefits when fouling potentially changes the effective relative downcomer pipe areas, and enables the operator to tune the distillation column for separating materials which have a tendency to decompose at the distillation conditions. These features are particularly advantageous for the use in columns with reboiled strippers.

Figure 2A:
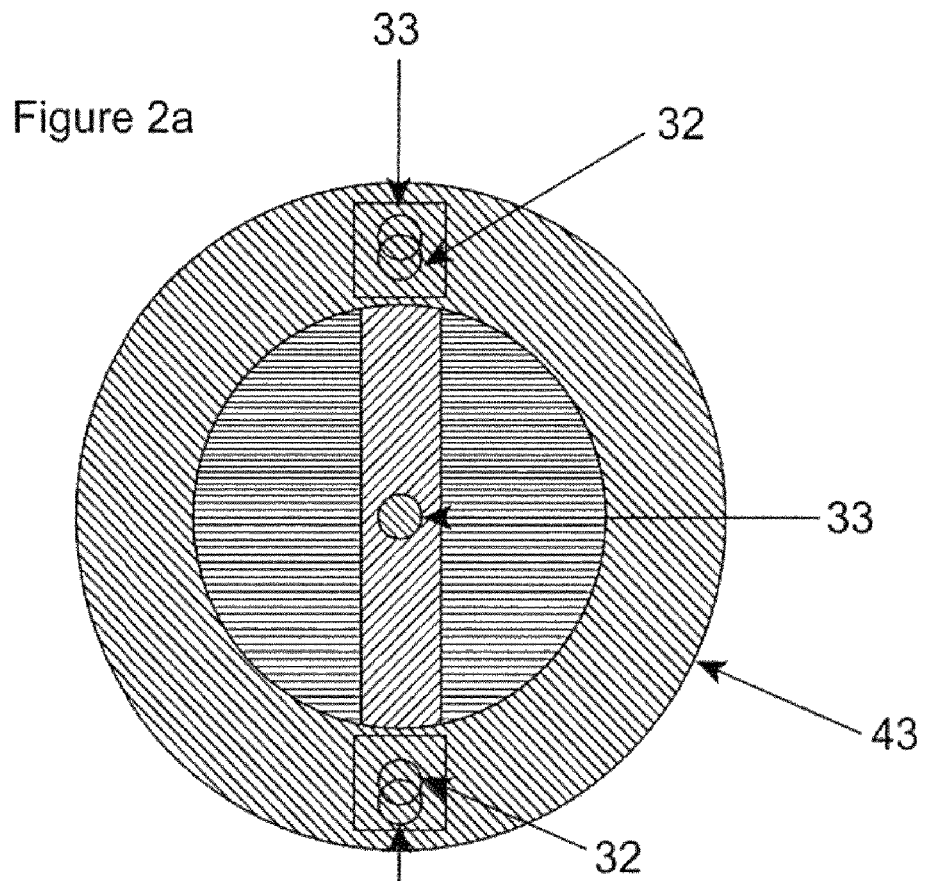
FIG. 2a shows a cross-sectional view of a distillation column of this invention.
Figure 2B:
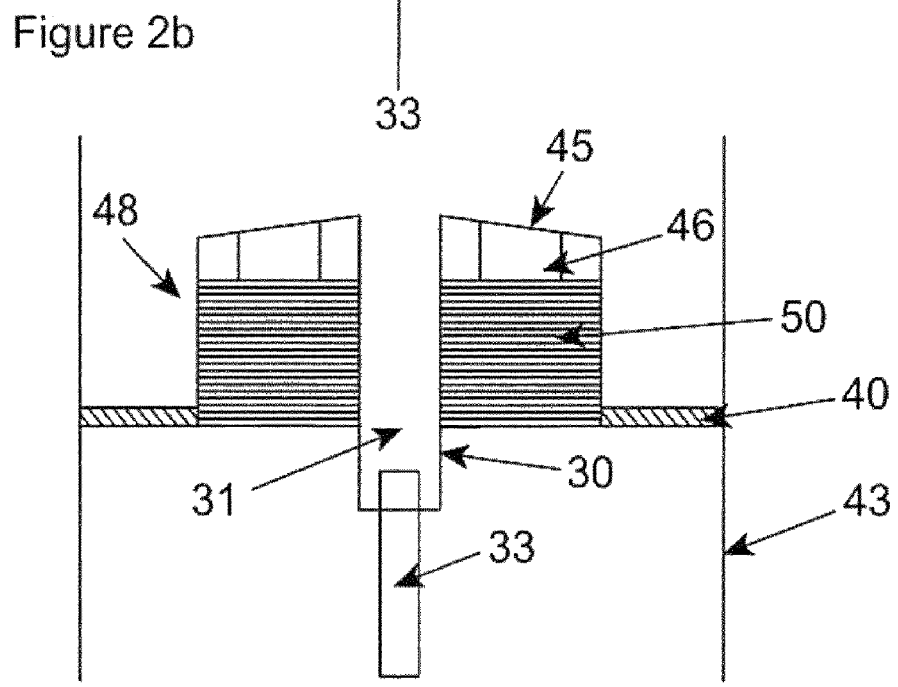
FIG. 2b shows a horizontal view of a distillation column of this invention.
Figure 3:
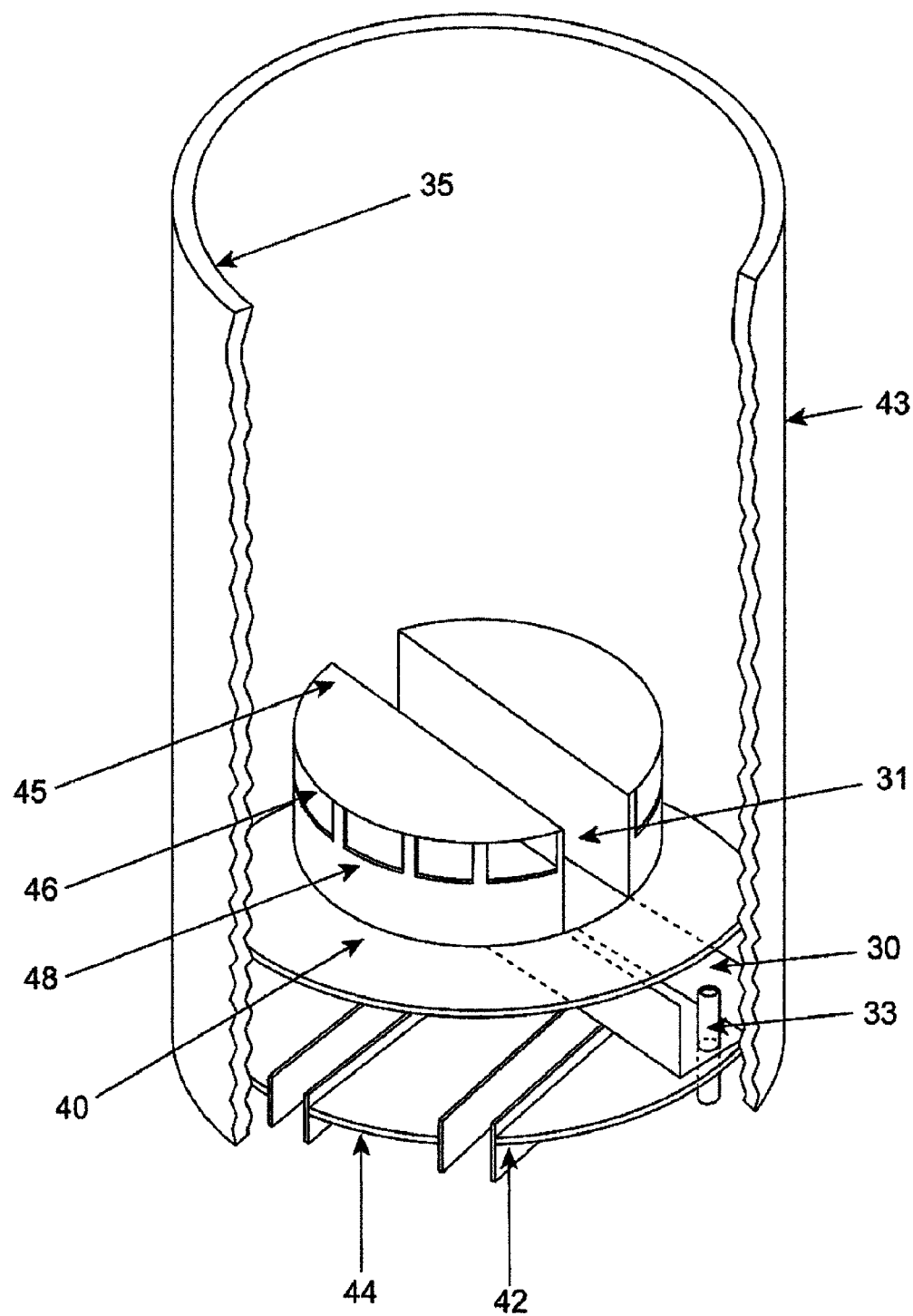
FIG. 3 shows an isometric view of a distillation column of this invention.

FIGS. 1, 2 and 3 illustrate embodiments of the flash zone of a distillation column 43. In the embodiment, a flash zone A of a distillation column 43 incorporates a liquid collection sump 30, with downcomer pipes 33, below a donut ring liquid collector tray deck 40, between 2 half cylinder vapor baffles, each of which comprises a riser section 50 and a riser hat 45. A feed inlet conduit 36 for supplying a liquid feed to the flash zone of the distillation column 43 penetrates the outer wall of the column at feed nozzle at 37. In some embodiments, the feed inlet conduit is positioned in a tangential orientation to the flash zone to provide a tangential liquid flow in the flash zone, thereby generating a cyclonic spin action flow, which facilitates separation of the liquid from the vapor. The flash zone is located above the stripping zone B of the column. Distillation tray 44 illustrated in FIG. 1 is the top stripping tray.

During operation of the distillation column, additional liquid collects on wash oil tray 39, passes through downcomer seal pan 38 and downward through overflash pipes 32 and onto the collector tray deck 40, where it mixes with the liquid entering the flash zone through the feed inlet conduit. Sealing boxes 41 located at each end of the tray deck provide the necessary gas sealing of the overflash pipes.

The donut ring collector tray deck 40 collects the liquid separated from the feed 2-phase mixture, as well as liquid from any wash oil zone (C) trays 39 above the flash zone through 32, and feeds the liquid through a liquid opening 31 (see FIG. 2) into a centralized liquid collection sump 30 suspended below the collector tray deck 40, where the liquids are completely mixed. In some embodiments, the liquid opening in the collector tray deck is situated between two of the vapor baffles which are positioned on the collector tray deck. The sump provides for increased residence time for additional mixing of the liquid portion of the feed with overflash liquids. The sump contains liquid downcomer pipes 33 which convey the liquid to the top stripping tray 44 located below the sump. From there, the liquid passes through stripping tray downcomers 42 to the tray below. In an embodiment, the trays in the stripping zone are termed multi-pass trays, indicating that liquid flowing onto the trays have more than one path available for flowing through the tray and onto the next tray below. Such multi-pass trays are used advantageously to accommodate high liquid flow rates. In the embodiment, the downcomer pipes 33 are sealed against gas flow into the pipes by the inlet liquid seal weirs 34 on the top stripping tray 44 below. The liquid flows over the seal weirs and is distributed horizontally across the bubbling area of a panel of the top stripping tray, for contacting with the stripping vapors flowing vertically up through the bubbling area 47 of the tray. The flow is similar through the remaining stripping trays below, although these trays will employ an alternating bubbling area panel and downcomer arrangement with the top stripping tray.

Vapor separated from the liquid feed which is supplied through 36 combines with stripping vapor entering the flash zone A from the stripping zone B. To prevent entrainment of liquid by the upflowing vapor from the stripping zone, the stripping vapor passes upward from the stripping zone through the vapor opening in the collector tray deck 40, further upward in the vapor baffle 48, from where it is deflected in the horizontal direction towards the column wall by passing outward through the vapor opening 46 between the riser section 50 and the riser hat 45. By causing the vapors from the stripping zone to flow in a horizontal direction, the baffle risers also prevent entrainment of entering feed liquid, from the feed transfer line 36, by the stripping vapors. Further, the use of the 2 half cylinder baffle risers allows fuller development of the cyclonic spin in the flash zone, thus enhancing the separation of liquid from the vapor, compared to the use of multiple rectangular risers used by existing vendor designs.

The mixed vapor then flows upward to the bottom wash oil zone tray 39. The vapor baffle 48 is provided on the collector tray to mitigate the entrainment of liquid by the upflowing vapors within the flash zone. In the embodiment illustrated in FIG. 1 and FIG. 2, a multiplicity of vapor openings in the collector tray is employed to provide that function. In the example embodiment, the cross-section profile of each vapor opening approximates a semi-circle, and the vapor baffle riser approximates a half cylindrical shape. In some other embodiments, the profile of each vapor opening may approximate a 3-sided or a 4 (or more)-sided figure.

FIG. 3 illustrates a perspective drawing of the tray deck, including a distillation column 43 having a feed inlet conduit for passing a feed to the column through feed nozzle 37. The liquid portion of the feed passes down the inner wall 35 of the distillation column and to the collector tray deck 40. From there the liquid portion passes through the liquid opening 31 and into the liquid collection sump 30. Liquid in the sump flows through liquid downcomer pipes 33 to the stripping tray 44, and from there through stripping tray downcomers 42. At the same time, vapors pass upward through the collector tray within vapor baffle 48 and through the vapor openings between the vapor baffle 48 and the riser hat 45.

What is claimed is:
1. A tray deck for improving the distribution of liquid within a distillation column, the deck comprising:
   a. a horizontal section for conducting a liquid mixture in circular flow across the section;
   b. at least one liquid opening in the horizontal section for passing liquid through the tray deck;

c. a sump suspended from the tray deck for receiving liquid which passes through the liquid opening, wherein the sump includes multiple downcomer pipes for delivering liquid from the sump;
d. at least one vapor opening for passing vapors through the tray deck; and
e. at least one vapor baffle for receiving vapor passed through the vapor opening.

2. The tray deck of claim 1 wherein the cross section of the sump defines the cross section of the liquid opening.

3. The tray deck of claim 1, wherein the cross section of the sump extends beyond the cross section of the liquid opening.

4. The tray deck of claim 1, wherein the sump comprises generally vertical sides and a bottom section.

5. The tray deck of claim 1, wherein the downcomer pipes have a circular cross section.

6. The tray deck of claim 1, wherein the downcomer pipes extend below a liquid level on a top stripper tray in the distillation column.

7. The tray deck of claim 1, wherein the sump includes at least one liquid downcomer pipe for each panel on a top stripper tray in the distillation column.

8. The tray deck of claim 1, wherein the at least one vapor baffle has a cross-section profile corresponding to the cross-section profile of the at least one vapor opening.

9. The tray deck of claim 1, wherein the at least one vapor baffle has a cross-section profile which is larger than the at least one vapor opening in the collector tray deck.

10. The tray deck of claim 1, wherein the at least one vapor baffle has a semi-circular cross section.

11. The tray deck of claim 1, wherein the at least one vapor baffle comprises a riser section and a riser hat.

12. The tray deck of claim 11, wherein the riser section and the riser hat define the at least one vapor opening for permitting the flow of vapors there through.

13. A distillation column which comprises:
a. a feed nozzle for introducing a vaporizing feed mixture into the distillation column; and
b. a tray deck, comprising:
i. a horizontal section for conducting a liquid mixture in circular flow across the section;
ii. at least one liquid opening in the horizontal section for passing liquid through the tray deck;
iii. a sump suspended from the tray deck for receiving liquid which passes through the liquid opening, wherein the sump includes multiple downcomer pipes for delivering liquid from the sump;
iv. at least one vapor opening for passing vapors through the tray deck; and
v. at least one vapor baffle for receiving vapor passed through the vapor opening.

14. The distillation column of claim 13, further comprising a feed inlet conduit which is positioned in a tangential orientation to the distillation column to provide a tangential liquid flow in the distillation column.

15. A flash zone within a distillation column, the flash zone comprising:
a. a feed nozzle for introducing a vaporizing feed mixture into the flash zone; and
b. a tray deck, comprising:
i. a horizontal section for conducting a liquid mixture in circular flow on the tray deck;
ii. at least one liquid opening in the horizontal section for passing liquid through the tray deck;
iii. a sump suspended from the tray deck for receiving liquid which passes through the liquid opening, wherein the sump includes multiple downcomer pipes for delivering liquid from the sump;
iv. at least one vapor opening for passing vapors through the tray deck; and
v. at least one vapor baffle for receiving vapor passed through the vapor opening.

16. The flash zone of claim 15, further comprising a feed inlet conduit which is positioned in a tangential orientation to the flash zone to provide a tangential liquid flow in the distillation column.

\* \* \* \* \*